No. 632,352. Patented Sept. 5, 1899.
G. W. JONES.
PAN OR LID LIFTER.
(Application filed June 23, 1899.)
(No Model.)
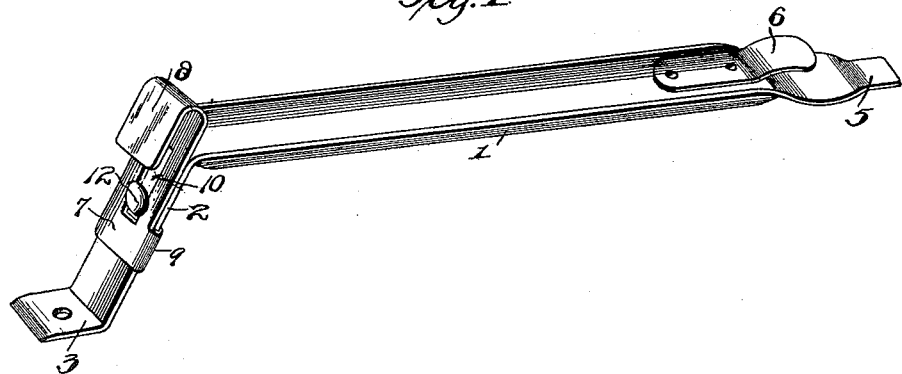
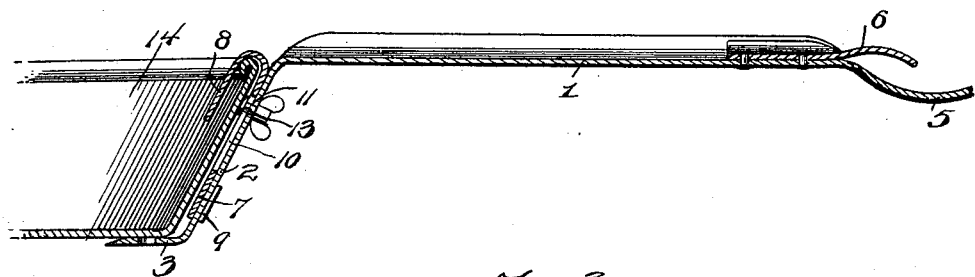
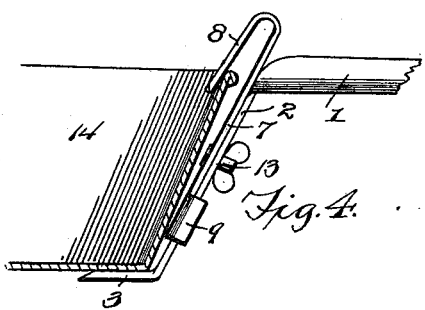
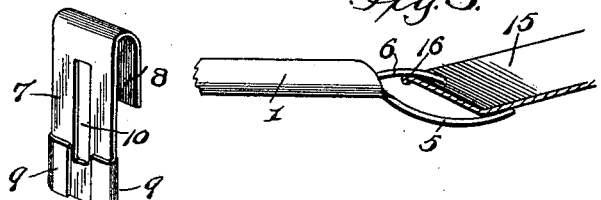
Witnesses
Ralph A. Shepard
F. C. Shepard
G. W. Jones Inventor
By his Attorneys,
C. A. Snow & Co.
THE NORRIS PETERS CO., PHOTO-LITHO., WASHINGTON, D. C.

UNITED STATES PATENT OFFICE.

GEORGE W. JONES, OF BIBB, TEXAS.

PAN OR LID LIFTER.

SPECIFICATION forming part of Letters Patent No. 632,352, dated September 5, 1899.

Application filed June 23, 1899. Serial No. 721,596. (No model.)

*To all whom it may concern:*

Be it known that I, GEORGE W. JONES, a citizen of the United States, residing at Bibb, in the county of Comanche and State of Texas, have invented a new and useful Pan or Lid Lifter, of which the following is a specification.

This invention relates to pan and stove-lid lifters, and has for its object to provide an improved adjustable hooked slide for engagement with the upper edge of the pans and also to locate the adjusting means within convenient reach of the operator.

To these ends the present invention consists in the combination and arrangement of parts, as will be hereinafter more fully described, shown in the accompanying drawings, and particularly pointed out in the appended claims, it being understood that changes in the form, proportion, size, and the minor details of construction may be made within the scope of the appended claims without departing from the spirit or sacrificing any of the advantages of the present invention.

In the drawings, Figure 1 is a perspective view of the improved implement. Fig. 2 is a longitudinal sectional view thereof applied to a pan. Fig. 3 is a detail perspective view of the adjustable hooked slide. Fig. 4 is a detail elevation illustrating another application of the adjustable hooked slide. Fig. 5 is a detail elevation illustrating the application of the lifting-tongue at the opposite end of the handle.

Corresponding parts in the several figures of the drawings are designated by like characters of reference.

Referring to the accompanying drawings, 1 designates the handle of the implement and is formed from a single piece of semitubular metal, having its forward end bent or deflected downward, forming a flat pendent shank 2. The lower end of this shank is bent forward, forming a flat foot 3, which is arranged substantially parallel with the handle and projects in front thereof. At its rear end the handle is contracted and offset downward, so as to form the tongue 5, which is adapted for use as a stove-lid lifter. Riveted or otherwise secured to the upper face of the handle and overhanging the lid-lifting tongue is a finger 6, which is adapted to engage the upper side of the stove-lid and aid in holding the tongue in the usual opening formed in the stove-lids.

Mounted upon the outer side of the shank 2 is a slide 7, having an outwardly-extending hook 8 bent from the upper end thereof. Located at the lower end of the slide is a pair of hook-shaped ears 9, which project inwardly from the opposite edges of the slide and across the rear face thereof opposite the hook 8. As best shown in Fig. 3, the slide is formed from a single blank of flat metal, the hook and ears being bent therefrom, and is provided with a longitudinal slot 10, alined between the ears and extending nearly the entire length of the slide. The slide thus formed is mounted upon the front outer face of the shank 2, with the hooked ears embracing the opposite edges and slidably connecting the slide to the shank. Fixed to the shank 2 is a pin 11, having its smooth stem extending through the slot in the slide and provided with an enlarged head 12, engaging the outer face of the slide and overlapping the opposite edges of the slot. The opposite end of the pin is threaded and projects in rear of the shank 2 and is provided with a thumb-screw 13, adapted to engage against the rear face of the shank and adjustably support the slide. It will be understood that the pin 11 fits loosely in the opening formed through the shank 2, so that the slide may be released and tightened by operation of the thumb-screw.

The operation of the device is best shown in Fig. 2, in which the foot 3 is illustrated as engaging against the under side of the bottom of a pan 14 and the shank 2 extending upward alongside of the side of the pan. The slide 7 is adjusted by means of the thumb-screw 13, so that the hook 8 may be engaged over the top edge of the pan, whereby the pan is firmly gripped between the foot 3 and the hook 8 and the pan may be safely and conveniently placed upon or removed from a stove. This application of the device practically forms a fixed handle and can be detached only by elevating the hooked slide 7.

In Fig. 4 I have illustrated the device arranged so that it can be readily attached to or disconnected from a pan without adjusting the hooked slide 7. It will be noted that the free end of the hook 8 engages over the upper rim of the pan, so that the shank of the device is inclined away from the side of the pan and the latter is supported by the foot 3 and held in place by the free end of the hook 8. Thus it will be seen that the device may be readily fitted to a pan by first engaging the foot 3 beneath the bottom of the pan and then engaging the free end of the hook 8 over the upper edge thereof without adjusting the slide tightly down upon the upper edge of the pan, as illustrated in Fig. 2. Furthermore, the device may be readily detached from the pan by tilting the rear end of the handle upward, so as to disengage the foot 3 from beneath the bottom of the pan, after which the device may be readily freed from its engagement with the pan.

The tongue 5 at the opposite end of the handle may be conveniently employed to lift shallow pans, such as pie and cake pans, as clearly illustrated in Fig. 5. The free end only of the tongue 5 engages against the bottom of the pan 15, while the overhanging finger 6 engages across the upper edge of the pan, as at 16, and the free end of said finger engages the inner face of the side of the pan, intermediate of the upper and lower edges thereof, whereby the device is firmly connected to the pan and may be readily connected to or removed therefrom.

The present device provides an exceedingly strong and durable implement, as the handle and shank thereof are formed integral and the finger 6 is firmly riveted thereto. The handle portion is rounded or semitubular, which also increases the strength thereof and provides a convenient hand-grasp, and the shank is flattened, so as to fit evenly against the side of a pan. Furthermore, it will be noted that the thumb-nut 13 is located in rear of the shank, and therefore in convenient position for adjusting the slide 7.

What I claim is—

1. An implement of the class described, comprising a handle, having a fixed pendent shank, provided with a foot, and a hooked slide having lateral hooked ears slidably embracing the opposite edges of the shank, and means for adjustably securing the slide to the shank, substantially as and for the purpose set forth.

2. In an implement of the class described, the combination with a handle having a pendent shank provided with a foot, of a hooked slide mounted upon the shank, a pin or bolt carried by the shank and adjustably engaging the slide, and a thumb-nut carried by the pin or bolt and engaging against the rear face of the shank, substantially as and for the purpose set forth.

3. In an implement of the class described, the combination with a handle having a pendent shank provided with a foot, of a hooked slide having a longitudinal slot, and opposite lateral hooked ears, a pin or bolt carried by the shank, projecting through the slot in the slide, and provided with a head overlapping the opposite edges of said slot, and a thumb-nut carried by the pin or bolt and engaging against the rear face of the shank, substantially as shown and described.

4. In an implement of the class described, the combination with a semitubular metallic handle formed from a single blank of metal, and having an integral flat shank and a foot therefor bent from one end of the handle, of a slide formed from a single blank of metal, having opposite lateral hooked ears bent from the lower end of the blank and across the rear side thereof, and slidably embracing the opposite longitudinal edges of the shank, the upper end of the blank being bent into a hook extending downwardly and across the outer face of the blank, and provided with a longitudinal slot, and a pin carried by the shank, projecting loosely through the slot in the slide, and provided with an enlarged head overlapping the opposite longitudinal edges of said slot, and a thumb-nut fitted to the rear end of the pin and engaging against the rear side of the shank, substantially as shown and described.

In testimony that I claim the foregoing as my own I have hereto affixed my signature in the presence of two witnesses.

GEORGE W. JONES.

Witnesses:
B. J. PITTMAN,
W. P. WEAVER.